(12) United States Patent
Von Berg et al.

(10) Patent No.: US 12,469,136 B2
(45) Date of Patent: Nov. 11, 2025

(54) DETERMINING ROTATION OF A PATIENT'S CHEST IN A MEDICAL IMAGE

(71) Applicant: KONINKLIJKE PHILIPS N.V., Eindhoven (NL)

(72) Inventors: Jens Von Berg, Hamburg (DE); Soubhik Paul, Bangalore (IN); Biswaroop Chakrabarti, Kolkata (IN); Sudipta Chaudhury, Bangalore (IN); Sven Kroenke-Hille, Hamburg (DE); Stewart Matthew Young, Hamburg (DE); Nataly Wieberneit, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/700,923

(22) PCT Filed: Nov. 8, 2022

(86) PCT No.: PCT/EP2022/081040
§ 371 (c)(1),
(2) Date: Apr. 12, 2024

(87) PCT Pub. No.: WO2023/088720
PCT Pub. Date: May 25, 2023

(65) Prior Publication Data
US 2024/0338822 A1    Oct. 10, 2024

(30) Foreign Application Priority Data

Nov. 18, 2021  (EP) .................................... 21208953

(51) Int. Cl.
*G06T 7/00* (2017.01)
*G06T 7/73* (2017.01)

(52) U.S. Cl.
CPC .............. G06T 7/0012 (2013.01); G06T 7/74 (2017.01); *G06T 2207/30008* (2013.01)

(58) Field of Classification Search
None
See application file for complete search history.

(56) References Cited

U.S. PATENT DOCUMENTS 10,039,514 B2   8/2018   Ishihara
12,076,158 B2 * 9/2024   Geiger ...................... G06T 7/30
(Continued)

FOREIGN PATENT DOCUMENTS

CN   111127427 A   5/2020
CN   111696083 A   9/2020
(Continued)

OTHER PUBLICATIONS

PCT International Search Report, International application No. PCT/EP2022/081040, Mar. 1, 2023.
(Continued)

*Primary Examiner* — Nancy Bitar
(74) *Attorney, Agent, or Firm* — Larry Liberchuk

(57) ABSTRACT

There is provided a computer-implemented method for determining rotation of a patient's chest in a medical image. The method comprises: receiving the medical image of the patient; processing the medical image to determine scapular spatial data relating to the patient's scapula; and determining rotation of the patient's chest with respect to at least one reference axis using the scapular spatial data.

15 Claims, 5 Drawing Sheets

(56) References Cited

U.S. PATENT DOCUMENTS

| | | |
|---|---|---|
| 2017/0224302 A1 | 8/2017 | Von Berg |
| 2021/0038189 A1* | 2/2021 | Liu .................... A61B 8/5223 |
| 2022/0249014 A1* | 8/2022 | Geiger .................... G06T 7/10 |
| 2024/0023809 A1 | 1/2024 | DeBaun |

FOREIGN PATENT DOCUMENTS

| | | | |
|---|---|---|---|
| CN | 112472111 A | 3/2021 | |
| EP | 3815609 A1 | 5/2021 | |
| WO | WO2020083764 A1 | 4/2020 | |
| WO | WO-2021114638 A1 * | 6/2021 | ............. G06F 18/24 |
| WO | WO-2021155373 A1 * | 8/2021 | ............ A61B 5/0013 |

OTHER PUBLICATIONS

Carmichael J.H.E. et al., "European Guidelines on Quality Criteria for Diagnostic Radiographic Images", Office for Official Publications of the European Communities, Jun. 1996.

Von Berg J. et al., "Robust Chest X-Ray Quality Assessment Using Convolutional Neural Networks and Atlas Regularization", Medical Imaging 2020: Image Processing, International Society for Optics and Photonics, p. 113131L., 2020.

Nousianen K. et al., "Atomating Chest Radiograph Imaging Quality Control", Physica Medica 83, pp. 138-145, 2021.

Namikawa T. et al., "Radiological Assessment of Shoulder Balance Following Posterior Spinal Fusion for Thoracic Adolescent Idiopathic Scoliosis", Scoliosis, Biomed Central Ltd, LO, vol. 10, No. Suppl 2, Feb. 11, 2015, p. S18, XP021212604.

Santosh K. C et al., "Automatically Detecting Rotation in Chest Radiographs Using Principal Rib-Orientation Measure for Quality Control", International journal of pattern recognition and artificial intelligence, Mar. 1, 2015, pp. 1-19, XP055916709.

Duong L. et al., "Real Time Noninvasive Assessment of External Trunk Geometry During Surgical Correction of Adolescent Idiopathic Scoliosis", Scoliosis, Biomed Central Ltd, LO, vol. 4, No. 1, Feb. 24, 2009, p. 5, XP021052092.

Gotfryd A. et al., "Current Methods for the Evaluation of Shoulder Balance in Idiopathic Adolescent Scoliosis: A Literature Review", JSM Neurosurg Spine, vol. 6, No. 1, pp. 1096, Mar. 2018, XP055916704. Retrieved from the Internet: URL:https://www.jscimedcentral.com/Neurosurgery/neurosurgery-6-1096.pdf.

* cited by examiner

DETERMINING ROTATION OF A PATIENT'S CHEST IN A MEDICAL IMAGE

FIELD OF THE INVENTION

The invention relates to methods and systems for determining rotation of a patient's chest in a medical image.

BACKGROUND OF THE INVENTION

Ensuring a non-rotated positioning of the patient is an important quality aspect in a chest posteroanterior (PA) radiograph because otherwise the locations of relevant anatomical structures in the image can deviate in appearance or be occluded from view. For example, lung parenchyma to be analyzed may be shadowed by thoracic structures when not acquired in the right angle. Previous solutions include estimating the rotation angle by localizing landmarks, in particular the clavicle tips and the spinous processes, and measuring deviations from a symmetric constellation. In some cases (e.g. scoliosis) this is not a good indicator for the overall chest rotation.

SUMMARY OF THE INVENTION

To better address one or more of these concerns, in a first aspect of invention there is provided a computer-implemented method for determining rotation of a patient's chest in a medical image. The method comprises: receiving the medical image of the patient; processing the medical image to determine scapular spatial data relating to the patient's scapula; and determining rotation of the patient's chest with respect to at least one reference axis using the scapular spatial data.

Thus, the approach to patient rotation detection proposed herein allows rotation of the patient's chest (i.e. thorax) to be accurately reflected, especially their inner organs such as the heart and the lungs, even in severe cases like spine scoliosis.

The method may further comprise, before determining the rotation, processing the scapular spatial data to confirm symmetry of the patient's scapulae, i.e. symmetry of the position of the scapulae in terms of lateralized scapula movement. This may be undertaken as one form of 'sanity check'. Confirming the symmetry of the patient's scapulae may comprise: identifying acromion and coracoid processes of the scapulae and determining lengths thereof; calculating ratios of coracoid length to acromion length for each of the left and right scapulae; and confirming the symmetry of the scapulae based on the calculated ratios. Confirming the symmetry of the scapulae based on the calculated ratios may comprise determining that the ratio for left scapula corresponds to the ratio for the right scapula within an acceptable tolerance. In some examples, a similarity or distance metric may be used to compare the ratios and thereby to confirm symmetry or otherwise. Additionally or alternatively, confirming the symmetry of the scapulae may be based on one or more other parameters selected from the group consisting of: an inferior angle of the scapulae; an angle between the clavicle and the acromion; an angle between a lateral border of the scapula and the humerus; and any combination thereof. Thus, broadly speaking, the method may comprise confirming scapular symmetry based on comparing values, for the left and right scapulae, of one or more scapular position parameters, in particular parameters relating to the relative positions of bony structures in or around the scapulae. Stated another way, processing the scapular spatial data to confirm symmetry of the patient's scapulae may comprise confirming absence of lateralized scapula movement in both scapulae, or least absence of unequal lateralized scapula movement.

Processing the medical image to determine the scapular spatial data may comprise segmenting the medical image to determine contours (i.e. boundaries or borders) of the patient's scapulae. The method may comprise using a convolutional neural network trained with annotated sample images to perform the image segmentation. The method may further comprise, before segmenting the medical image, processing the image to localize one or more landmarks for facilitating the image segmentation.

Patient rotation may be determined geometrically. Determining the rotation of the patient's chest may thus comprise using the scapular spatial data to calculate a scapula line connecting corresponding points on the patient's scapulae, and determining the rotation using a displacement between the scapula line and the at least one reference axis. In one example, the scapula line connects two points on contours of the respective scapulae each of which is a vertex on an inferior angle of a border of the respective scapula, or in other words lowermost with respect to the patient. In other examples, other appropriate anatomical reference points are chosen for the scapula line. Determining the rotation may comprise determining patient rotation within the image plane and/or determining patient rotation outside of the image plane. In the case that in-plane patient rotation is determined, the at least one reference axis comprises a detector plane axis, while the displacement comprises an angular displacement between the scapula line and the detector plane axis, with the determination of the rotation comprising determining the in-plane rotation of the patient using the angular displacement. The detector plane axis may for example be horizontal with respect to the image or detector, but it will be appreciated that any orientation may be chosen for the detector plane axis, including at least a vertical axis. In the case that out-of-plane patient rotation is determined, the at least one reference axis may comprise for example a medial axis of the patient's body, while the displacement comprises a linear displacement between a midpoint of the scapula line and the medial axis, with the determination of the rotation comprising determining the out-of-plane rotation of the patient using the linear displacement.

Additionally or alternatively to the geometric determination of patient rotation, patient rotation (and/or scapular symmetry) may be determined empirically, for example using machine learning. Thus, the method may comprise using a trained machine learning model to determine the rotation of the patient's chest with respect to at least one reference axis using the scapular spatial data.

Accordingly, there is provided in a second aspect a method of training the machine learning model of the first aspect. Training data for use in training the model may comprise medical images which show patient rotation to varying degrees and which are appropriately labelled by a qualified radiographer. The training data may furthermore include medical images of different age groups, gender groups and from different geographies to make the model more robust. Training data can also comprise artificially modified such data or synthesized data that appears similar to the original patient data.

The term "scapular spatial data" as used herein refers to data that is capable of being used to determine the position and/or shape of the scapulae. In particular, the scapular spatial data may comprise data indicating the location of the contours of the scapulae such as that resulting for example from a process of image segmentation.

The method of the first and/or second aspect may be computer implemented.

According to a third aspect, there is provided a computing system configured to perform the method of the first and/or second aspect.

According to a fourth aspect, there is provided a computer program product comprising instructions which, when executed by a computing system, enable or cause the computing system to perform the method of the first and/or second aspect.

According to a fifth aspect, there is provided a computer-readable medium comprising instructions which, when executed by a computing system, enable or cause the computing system to perform the method of the first and/or aspect.

The invention may include one or more aspects, examples or features in isolation or combination whether or not specifically disclosed in that combination or in isolation. Any optional feature or sub-aspect of one of the above aspects applies as appropriate to any of the other aspects.

These and other aspects of the invention will be apparent from and elucidated with reference to the embodiments described hereinafter.

BRIEF DESCRIPTION OF THE DRAWINGS

A detailed description will now be given, by way of example only, with reference to the accompanying drawings, in which:—

DETAILED DESCRIPTION OF EMBODIMENTS

According to the present disclosure, rotation of a patient's chest in a medical image is determined by processing the medical image to determine scapular spatial data relating to the patient's scapulae and determining rotation of the patient's chest with respect to at least one reference axis using the scapular spatial data.

Figure 1:
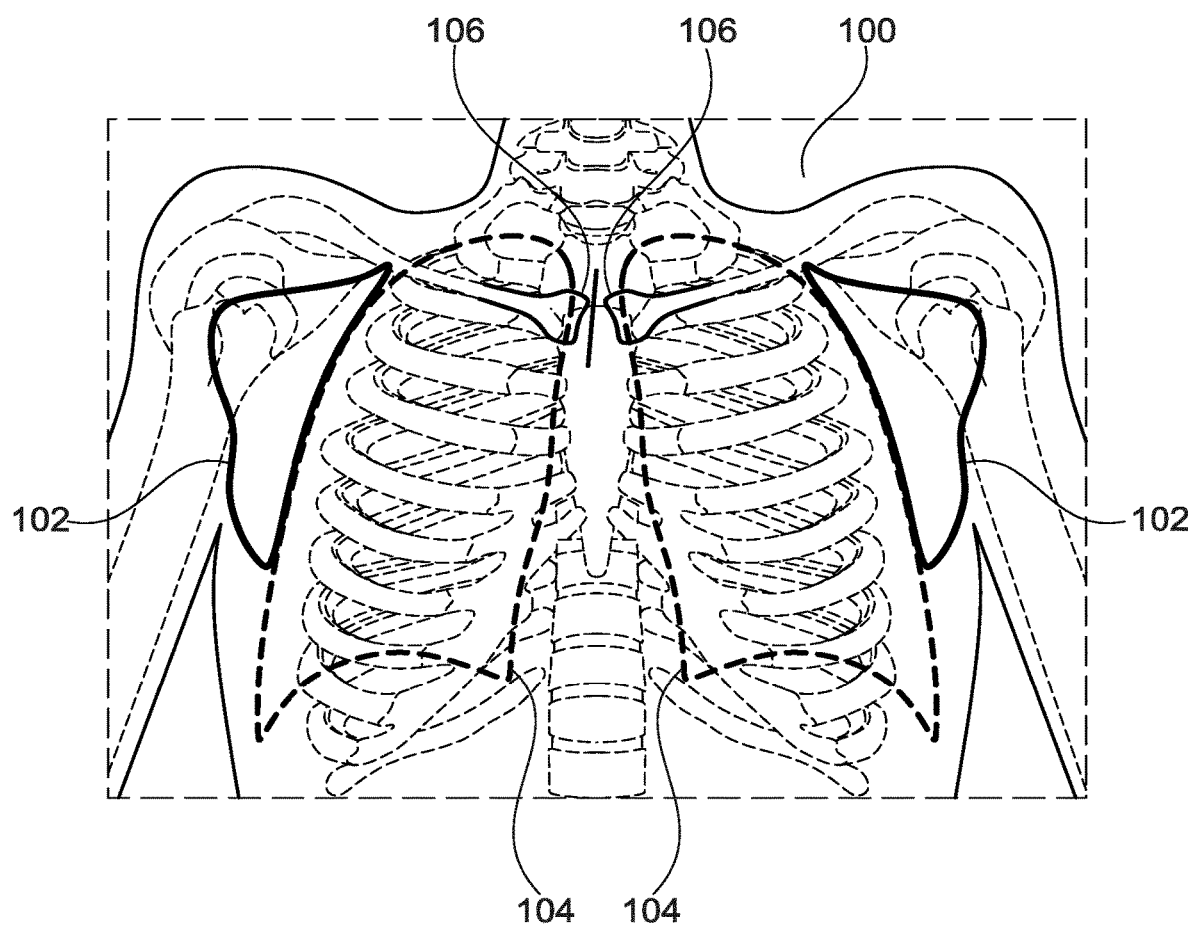
FIG. 1 illustrates image segmentation to localize anatomical structures including a patient's scapula.

FIG. 1 illustrates the use of image segmentation to localize anatomical structures including the patient's scapulae in a medical image 100 and thereby to obtain the scapular spatial data. As shown, the result of the image segmentation is to locate the scapulae and their contours 102. Additionally, contours of the lungs 104 and clavicles 106 may be located. The output of the image segmentation is spatial data including at least scapular spatial data indicating the shape and position of the scapulae. The image 100 may be segmented using a convolutional neural network trained with annotated sample images. In order to achieve better performance with a comparable amount of annotation effort, landmarks may first be localized before determining the contours, as described for example in VON BERG, J. et al. Robust chest x-ray quality assessment using convolutional neural networks and atlas regularization. In: Medical Imaging 2020: Image Processing, International Society for Optics and Photonics. 2020. p.113131L.

Using the scapular spatial data, rotation of the patient's chest with respect to at least one reference axis may then be determined. Using the shape and positioning of the shoulder blades and optionally also the lung fields to assess the rotation of the patient provides a better reflection of the rotation of the whole chest. However, scapulae have increased mobility compared to the clavicles and spine with more degrees of freedom, being capable of medial and lateral rotation, abduction, adduction, and so on. Thus, the present disclosure envisages performing an optional sanity check to confirm that the scapulae are symmetric with respect to the patient (i.e. that there is no lateralized scapula movement), before determining patient rotation using the scapular spatial data.

Figure 2:
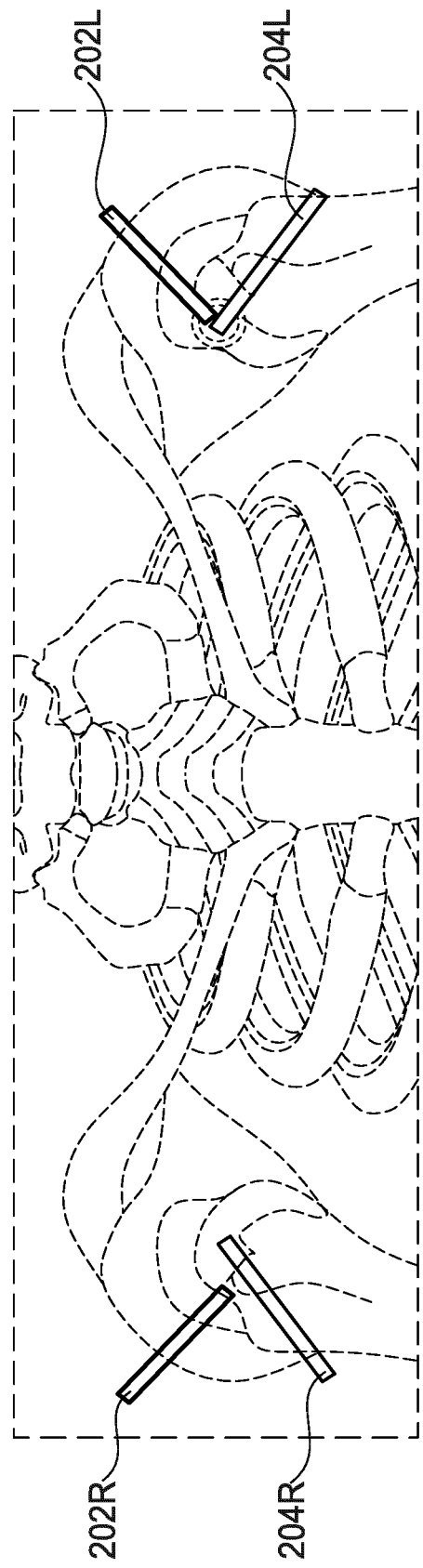
FIG. 2 illustrates the determination of relative lengths of the acromion and coracoid processes of both scapulae for the purposes of confirming symmetry of scapula position.

FIG. 2 illustrates the confirmation of symmetry in scapula position. The projections of the acromion and coracoid processes of the scapulae are identified bilaterally, their end points identified through segmentation, and their lengths determined. Indicated in FIG. 2 are the length 202L of the left acromion, the length 204L of the left coracoid, the length 202R of the right acromion, and the length 204R of the right coracoid. The ratios $$R_L = \frac{\text{length of left coracoid}}{\text{length of left acromion}}$$

and $$R_R = \frac{\text{length of right coracoid}}{\text{length of right acromion}}$$

are calculated. In the absence of lateralized scapula movement, the left ratio $R_L$ corresponds to the right ratio $R_R$, within a given precision. It will be understood that other parameters may be utilized in addition or instead to assess scapular symmetry, viz. inferior angle of scapulae, angle between the clavicle and the acromion, angle between lateral border of the scapula and the humerus, etc.

Figure 3A:
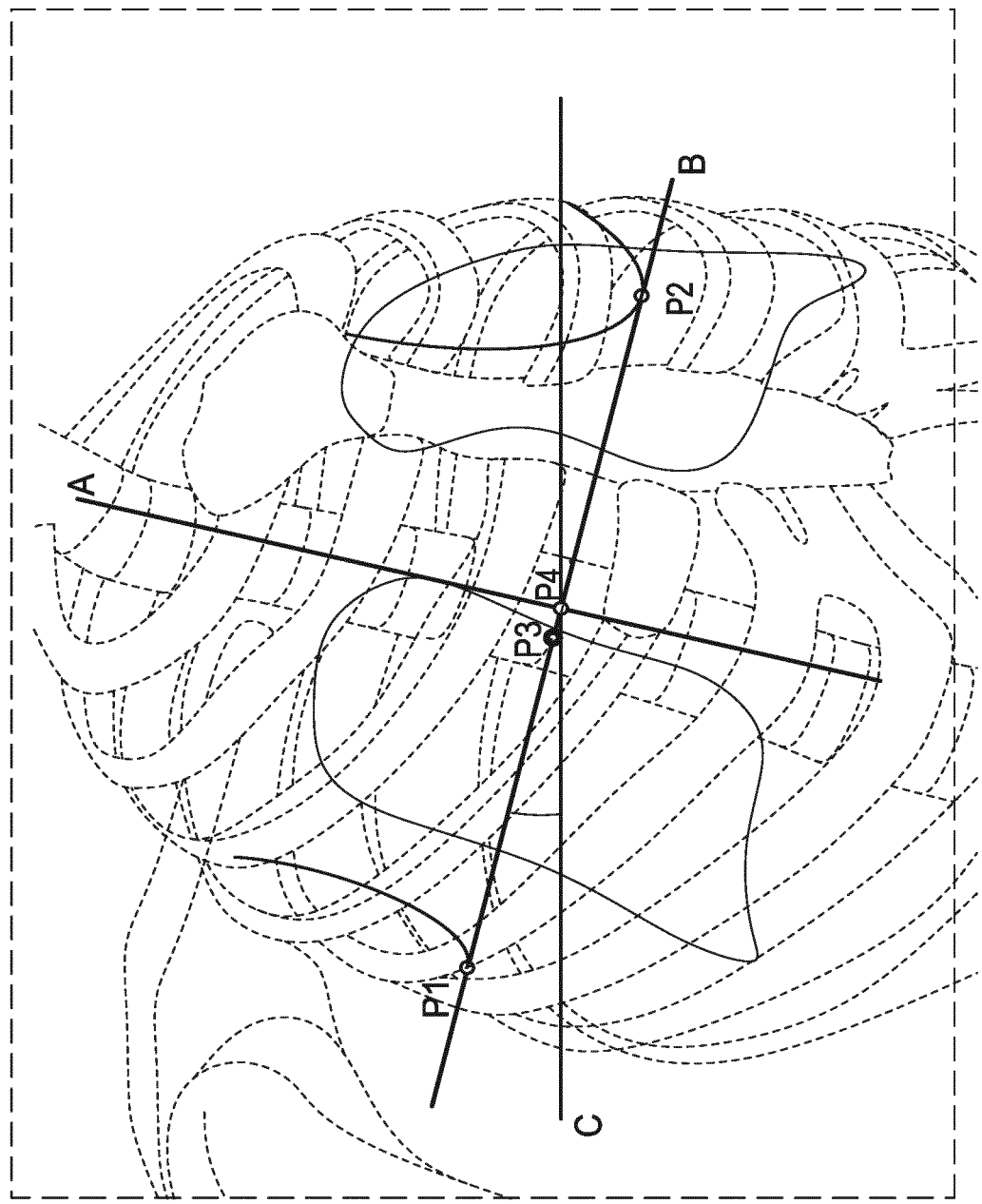
FIGS. 3A and 3B illustrate the determination of both in-plane and out-of-plane patient rotation using scapular spatial data.
Figure 3B:
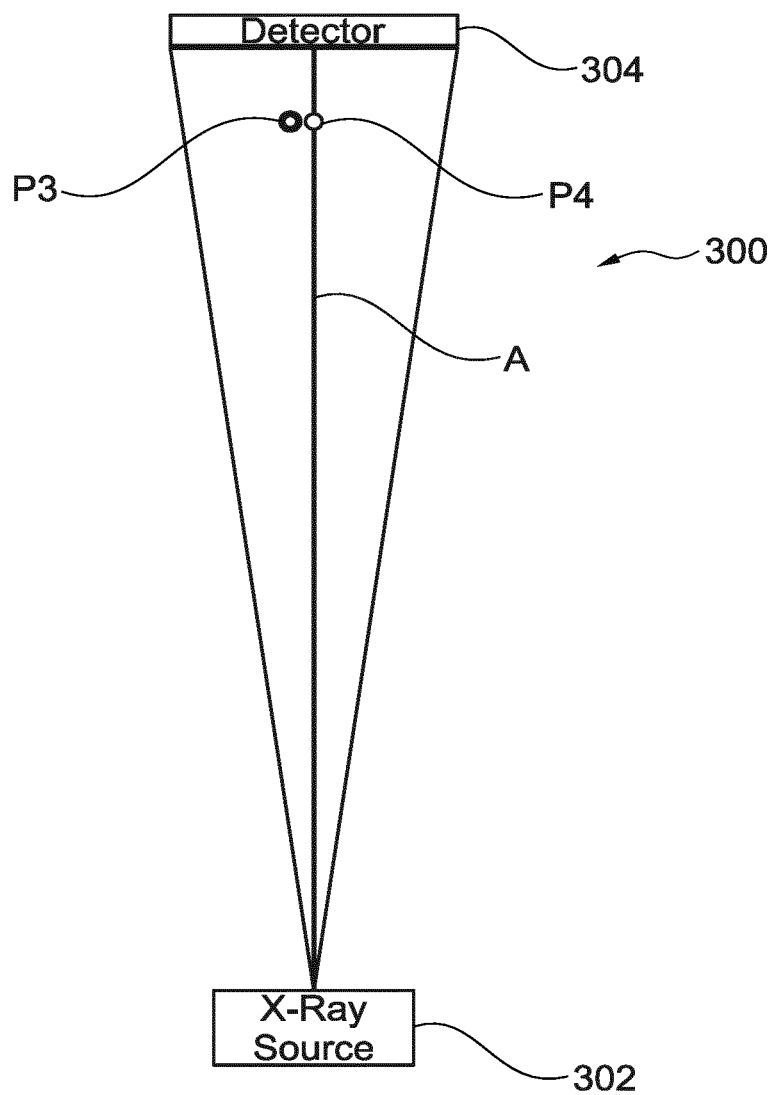

FIGS. 3A and 3B illustrate the determination of both in-plane and out-of-plane patient rotation using the scapular spatial data.

Out-of-plane patient rotation may be determined with reference to a suitable reference axis, in this case the medial axis of the patient's body, which is indicated in FIG. 3A as line A. Such a rotation axis may be robustly determined by registering a chest atlas to the image in which such an axis is annotated, similar to the technique described in VON BERG, J. et al. Robust chest x-ray quality assessment using convolutional neural networks and atlas regularization. In: Medical Imaging 2020: Image Processing, International Society for Optics and Photonics. 2020. p.113131L. The lowest points [P1, P2] on the inferior border of the scapulae are calculated. A scapula line, indicated as line B in FIG. 3A, connects the points P1 and P2. The midpoint of line B is found, which is indicated in FIG. 3A as point P3. The intersection of lines A and B is found, which is indicated as point P4. The distance between P3 and P4 corresponds to a component of the out-of-plane patient rotation. This is also illustrated in FIG. 3B, which shows the phenomenon with respect to a source 302 and detector 304 of an x-ray system 300. The more the patient is rotated, the greater the linear displacement between the points P3 and P4 becomes.

In-plane patient rotation may be determined with reference to a detector plane axis. FIG. 3A, for example, illustrates line C as a horizontal axis in the image or detector plane. The angular displacement between lines B and C corresponds to the in-plane rotation of the patient.

Such image information can be used to train a regression convolutional neural network to improve the accuracy of the patient rotation determination. For example, a trained regression convolutional neural network may be used to estimate the rotation angle from the contours 102 represented by the scapular spatial data. This approach may follow the method explained in KRÖNKE et al. CNN-based pose-estimation of musculoskeletal X-ray images. Philips ocupai conference. 2021, according to which it was successfully applied to a similar task, namely to estimate the pose and flexion of ankle joints from a single radiograph.

Numerous variations to the above-described systems and methods are envisaged by the present disclosure. For example, the patient rotation determination methods disclosed herein may be used independently or in combination with existing methods that use the clavicles and the spine. In another example, the scapular spatial data used by the systems and methods disclosed herein result from a process used to localize the scapulae and analyze them in shape and positioning for the purpose of an independent "shoulder blade checker". Also the lung fields may be localized for this purpose. In yet another example, the ratios $R_L$ and $R_R$ may be plotted to generate a nomogram with acceptable tolerance bands. If the values calculated for a patient under investigation appear on the nomogram, it can be assumed that the scapulae are symmetric with respect to the patient. In a still further example, chest rotation is estimated based on redundant x-ray contours in addition to or instead of the contours of the scapulae.

The systems and methods disclosed herein may be applied in the context of x-ray quality assessment.

Figure 4:
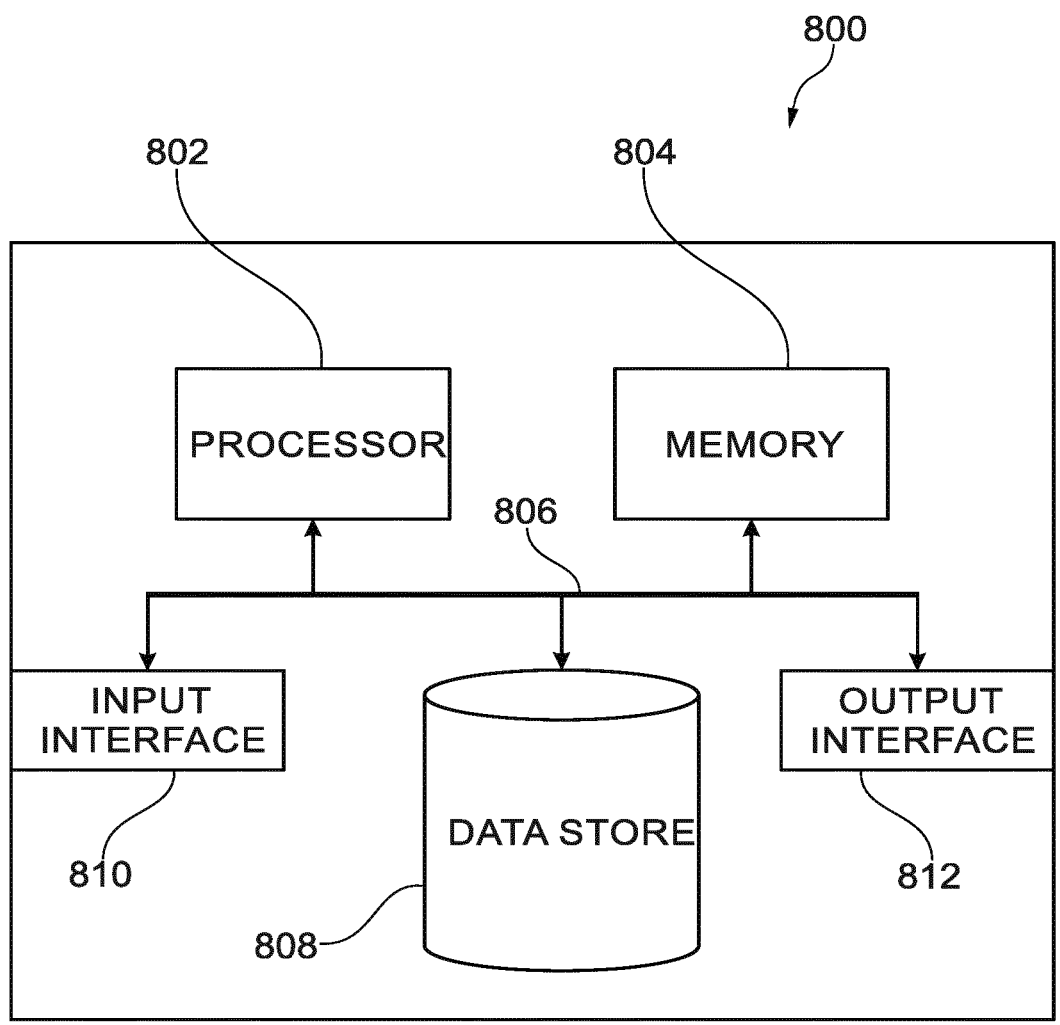
FIG. 4 illustrates a computing system that can be used in accordance with the present disclosure.

FIG. 4 illustrates an exemplary computing system 800 that can be used in accordance with the systems and methods disclosed herein is illustrated. The computing system 800 may form part of or comprise any desktop, laptop, server, or cloud-based computing system. The computing system 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing system 800 additionally includes a data store 808 that is accessible by the processor 802 by way of the system bus 806. The data store 808 may include executable instructions, log data, etc. The computing system 800 also includes an input interface 810 that allows external devices to communicate with the computing system 800. For instance, the input interface 810 may be used to receive instructions from an external computer device, from a user, etc. The computing system 800 also includes an output interface 812 that interfaces the computing system 800 with one or more external devices. For example, the computing system 800 may display text, images, etc. by way of the output interface 812.

It is contemplated that the external devices that communicate with the computing system 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing system 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing system 800 may be a distributed system. Thus, for instance, several devices may be in communication by way of a network connection and may collectively perform tasks described as being performed by the computing system 800.

Various functions described herein can be implemented in hardware, software, or any combination thereof. If implemented in software, the functions can be stored on or transmitted over as one or more instructions or code on a computer-readable medium. Computer-readable media include computer-readable storage media. Computer-readable storage media can be any available storage media that can be accessed by a computer. By way of example, and not limitation, such computer-readable storage media can comprise FLASH storage media, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

It has to be noted that embodiments of the invention are described with reference to different categories. In particular, some examples are described with reference to methods whereas others are described with reference to apparatus. However, a person skilled in the art will gather from the description that, unless otherwise notified, in addition to any combination of features belonging to one category, also any combination between features relating to different category is considered to be disclosed by this application. However, all features can be combined to provide synergetic effects that are more than the simple summation of the features.

While the invention has been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

The word "comprising" does not exclude other elements or steps.

The indefinite article "a" or "an" does not exclude a plurality. In addition, the articles "a" and "an" as used herein should generally be construed to mean "one or more" unless specified otherwise or clear from the context to be directed to a singular form.

A single processor or other unit may fulfil the functions of several items recited in the claims.

The mere fact that certain measures are recited in mutually different dependent claims does not indicate that a combination of these measures cannot be used advantageously.

A computer program may be stored/distributed on a suitable medium, such as an optical storage medium or a solid-state medium supplied together with or as part of other hardware, but may also be distributed in other forms, such as via the internet or other wired or wireless communications systems.

Any reference signs in the claims should not be construed as limiting the scope.

Unless specified otherwise, or clear from the context, the phrases "one or more of A, B and C", "at least one of A, B, and C", and "A, B and/or C" as used herein are intended to mean all possible permutations of one or more of the listed items. That is, the phrase "X comprises A and/or B" is satisfied by any of the following instances: X comprises A; X comprises B; or X comprises both A and B.

The invention claimed is:

1. A computer-implemented method for determining rotation of a patient's chest in a medical image, the method comprising:
   receiving the medical image of the patient;
   processing the medical image to determine scapular spatial data relating to the patient's scapulae;
   determining rotation of the patient's chest with respect to at least one reference axis using the scapular spatial data; and
   prior to determining the rotation, performing a sanity check by processing the scapular spatial data to confirm symmetry of the patient's scapulae.

2. The method of claim 1, wherein confirming the symmetry of the patient's scapulae comprises:
   identifying acromion and coracoid processes of the scapulae and determining lengths thereof;
   calculating ratios of coracoid length to acromion length for each of the left and right scapulae; and
   confirming the symmetry of the scapulae based on the calculated ratios.

3. The method of claim 2, wherein confirming the symmetry of the scapulae based on the calculated ratios comprises determining that the ratio for left scapula corresponds to the ratio for the right scapula within an acceptable tolerance.

4. The method of claim 1, wherein confirming the symmetry of the scapulae is based on one or more parameters selected from the group consisting of: an inferior angle of the scapulae; an angle between the clavicle and the acromion; an angle between a lateral border of the scapula and the humerus; and any combination thereof.

5. The method of claim 4, wherein confirming symmetry of the patient's scapulae is based on comparing values, for the left and right scapulae, of one or more of the parameters.

6. The method of claim 1, wherein processing the medical image to determine the scapular spatial data comprises segmenting the medical image to determine contours of the patient's scapulae.

7. The method of claim 6, comprising using a convolutional neural network trained with annotated sample images to perform the image segmentation.

8. The method of claim 6, further comprising, before segmenting the medical image to determine the contours of the patient's scapulae, processing the image to localize one or more landmarks for facilitating the segmentation.

9. The method of claim 1, wherein determining the rotation of the patient's chest comprises using the scapular spatial data to calculate a scapula line connecting corresponding points on the patient's scapulae, and determining the rotation using a displacement between the scapula line and the at least one reference axis.

10. The method of claim 9, wherein the scapula line connects two points on contours of the respective scapulae each of which is a vertex on an inferior angle of a border of the respective scapula.

11. The method of claim 9, wherein the at least one reference axis comprises a detector plane axis, wherein the displacement comprises an angular displacement between the scapula line and the detector plane axis, and wherein determining the rotation comprises determining an in-plane rotation of the patient using the angular displacement.

12. The method of claim 9, wherein the at least one reference axis comprises a medial axis of the patient's body, wherein the displacement comprises a linear displacement between a midpoint of the scapula line and the medial axis, and wherein determining the rotation comprises determining an out-of-plane rotation of the patient using the linear displacement.

13. The method of claim 1, comprising using a trained machine learning model to determine the rotation of the patient's chest with respect to at least one reference axis using the scapular spatial data.

14. A computing system configured to perform the method of claim 1.

15. A non-transitory computer readable medium comprising instructions which, when executed by a computing system, cause the computing system to perform the method of claim 1.

* * * * *